(12) United States Patent
Hunsinger

(10) Patent No.: US 8,765,089 B2
(45) Date of Patent: Jul. 1, 2014

(54) PROCESS AND APPARATUS FOR REDUCING NITROGEN OXIDES AND HALOGENATED ORGANIC COMPOUNDS IN INCINERATION PLANTS

(75) Inventor: Hans Hunsinger, Weingarten (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 21 days.

(21) Appl. No.: 12/294,098

(22) PCT Filed: Mar. 8, 2007

(86) PCT No.: PCT/EP2007/001996
§ 371 (c)(1),
(2), (4) Date: Sep. 23, 2008

(87) PCT Pub. No.: WO2007/118554
PCT Pub. Date: Oct. 25, 2007

(65) Prior Publication Data
US 2009/0208395 A1 Aug. 20, 2009

(30) Foreign Application Priority Data
Apr. 11, 2006 (DE) .......................... 10 2006 016 963

(51) Int. Cl.
*B01D 53/56* (2006.01)
(52) U.S. Cl.
USPC .................... 423/235; 423/215.5; 423/240 R; 423/243.01; 423/243.06; 422/168; 422/169; 422/172
(58) Field of Classification Search
USPC ................. 423/235, 236, 240 R, 210, 215.5, 423/243.01, 243.06; 588/256, 405, 406, 588/408, 316, 320, 319; 422/168, 169, 172
See application file for complete search history.

(56) References Cited

U.S. PATENT DOCUMENTS 3,944,657 A * 3/1976 Furkert ...................... 423/541.4
4,073,862 A * 2/1978 Haese ........................... 423/220
(Continued)

FOREIGN PATENT DOCUMENTS

CN 1565707 A 1/2005
DE 3912563 10/1990
(Continued)

OTHER PUBLICATIONS

Raghunathan K et al: "Role of Suflur in Reducing PCDD and PCDF Formation", Environmental Science & Technology, vol. 30, No. 6, Mar. 15, 1996, XP-002310557, pp. 1827-1834.
(Continued)

*Primary Examiner* — Kaj K Olsen
*Assistant Examiner* — Pritesh Darji
(74) *Attorney, Agent, or Firm* — Leydig, Voit & Mayer, Ltd.

(57) ABSTRACT

A process for reducing nitrogen oxides and halogenated organic compounds in an incineration plant having at least one combustion chamber. The process comprises separating out fly ash using a dust collector. Water is added to and hydrochloric acid separated out in a first acid-operated scrubber. Water and ammonia are added so as to separate out sulphur dioxide in a second neutral or slightly acid-operated scrubber so as to form ammonium sulphite, a portion of the ammonium sulphite thereby reacts with oxygen so as to form an aqueous ammonium sulphate/ammonium sulphite solution. The aqueous ammonium sulphate/ammonium sulphite solution is introduced into an oxygen-containing smoke gas downstream of a secondary gas introduction area so as to decompose the ammonium sulphate and ammonium sulphite so as to form ammonia and sulphur dioxide. Ammonia, oxygen and nitrogen oxides are reduced in the smoke gas by selective non-catalytic reduction so as to produce nitrogen and water, the chloride-containing fly ash in the smoke gas reacting with sulphur dioxide, water and oxygen so as to produce sulphates and hydrochloric acid.

3 Claims, 5 Drawing Sheets

(56) References Cited

U.S. PATENT DOCUMENTS

| | | | |
|---|---|---|---|
| 5,599,508 A * | 2/1997 | Martinelli et al. | 422/169 |
| 5,609,841 A * | 3/1997 | Greefkes et al. | 423/243.01 |
| 6,139,807 A | 10/2000 | Risse et al. | |
| 2003/0065236 A1 * | 4/2003 | Vosteen et al. | 588/208 |
| 2004/0105802 A1 | 6/2004 | Duncan et al. | |
| 2008/0236458 A1 | 10/2008 | Hunsinger | |

FOREIGN PATENT DOCUMENTS

| | | |
|---|---|---|
| DE | 4032945 | 1/1992 |
| DE | 4123155 A1 | 1/1992 |
| DE | 19731062 | 1/1999 |
| DE | 19802247 A1 | 7/1999 |
| DE | 19849021 | 4/2000 |
| DE | 10338752 A1 | 4/2005 |
| JP | 54082366 | 6/1979 |
| JP | 2293018 A | 12/1990 |
| JP | 4074513 A | 3/1992 |
| RU | 2102122 C1 | 1/1998 |
| WO | WO-9200136 | 1/1992 |
| WO | WO 9208541 A1 | 5/1992 |
| WO | WO-2005021136 | 3/2005 |

OTHER PUBLICATIONS

R.D. Griffin: "A new theory of Dioxin Formation in muncipal solid waste combustion", Chemposphere, vol. 15, Nos. 9-12, pp. 1987-1990, Pergamon Journals Ltd, 1986.

P. Strasser et al. "Betriebserfahrungen mit der Rauchgasentschwefelungsanlage des Rheinhafen-Dampfwerkes und des Grosskraftwerkes Mannheim", user report Abgasreinigung, special edition Staub Reinhaltung der Luft (1987), book 10, pp. 63-68 [Concise Statement in Specification on p. 2].

J. Furrer et al., "Balance of NH3 and behavior of polychlorinated dioxins and furans in the course of the selective non-catalytic reduction of nitric oxide at the TAMARA waste incineration plant", Waste Management 18, 1998, pp. 417-422.

European Patent Office, Search Report in International Patent Application No. PCT/EP2007/001996.

* cited by examiner

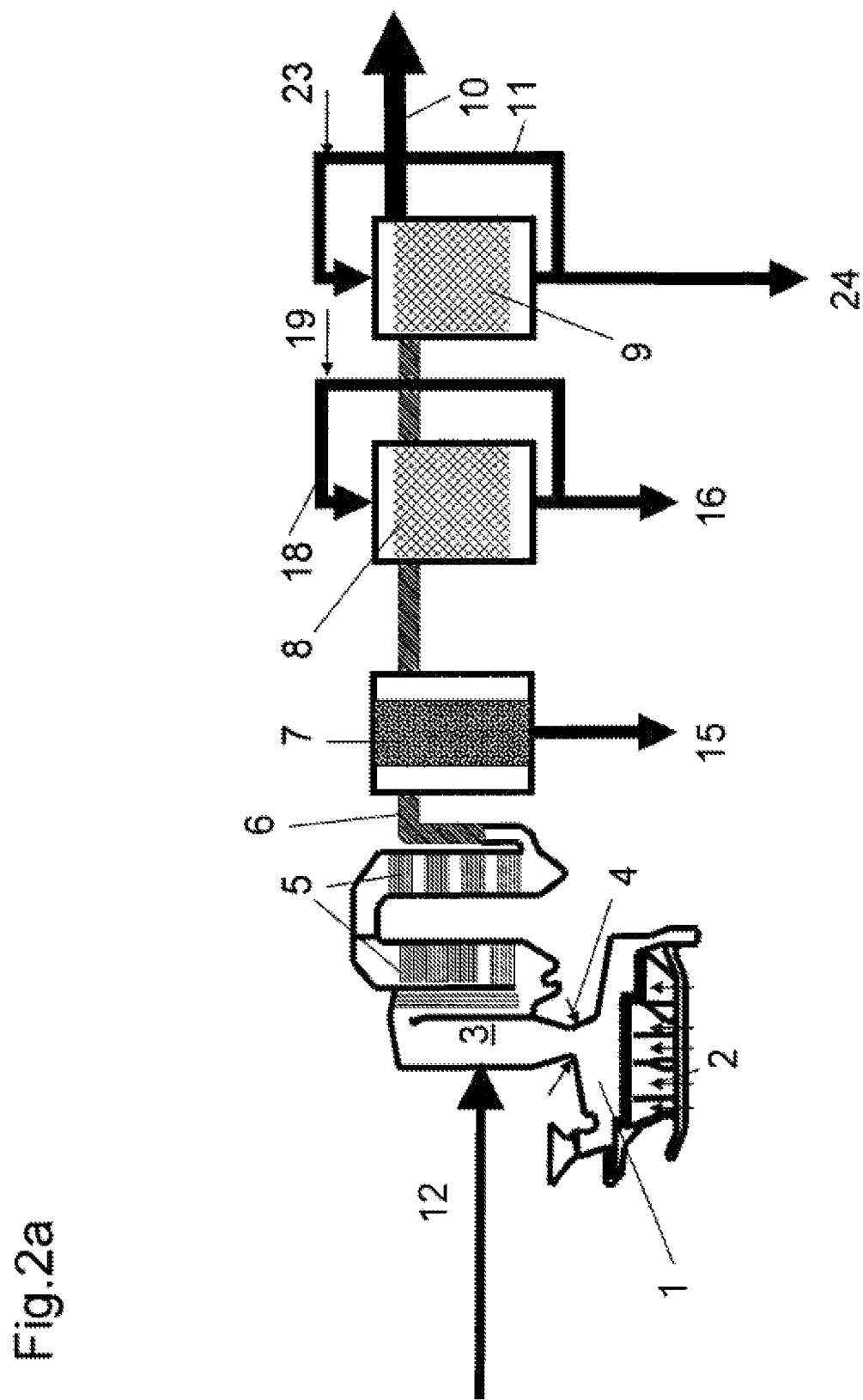

PROCESS AND APPARATUS FOR REDUCING NITROGEN OXIDES AND HALOGENATED ORGANIC COMPOUNDS IN INCINERATION PLANTS

CROSS REFERENCE TO RELATED APPLICATIONS

This application is a U.S. National Phase application under 35 U.S.C. §371 of International Application No. PCT/EP2007/001996, filed on Mar. 8, 2007 and claims benefit to German Patent Application No. DE 10 2006 016 963.8, filed on Apr. 11, 2006. The International Application was published in German on Oct. 25, 2007 as WO 2007/118554 A1 under PCT Article 21(2).

FIELD

The present invention relates to a process and apparatus for reducing nitrogen oxides and halogenated organic compounds in incineration plants having at least one combustion chamber. The process and apparatus are also equally suitable for reducing boiler corrosion by reducing the chloride content in the fly ash which is produced during operation and in the ash deposits which form on the boiler surfaces.

BACKGROUND

Combustion processes in which fuels containing sulphur, nitrogen and chlorine are burnt basically release sulphur dioxide, nitrogen oxides and hydrochloric acid as well as halogenated organic compounds. Due to their toxicity, these substances are often subject to national emission limits which have been laid down, for example, for the Federal Republic of Germany by the legislator in the 17$^{th}$ Federal Emissions Control Ordinance (17$^{th}$ BImSchV) for compounds from waste incineration plants.

During the combustion in incineration plants of nitrogen-containing fuels, such as domestic refuse or various biomasses, such as stalk plants or crops, nitrogen oxides ($NO_x$) are substantially produced from the nitrogen (N) bound in the fuel.

In industrial firings, solid fuels are burnt in two stages. The solid fuel is burnt in a first stage by adding primary air. Primary air is generally added in a sub-stoichiometric manner. The incomplete burn-out resulting therefrom, which is to be attributed to a local lack of oxygen in the combustion bed, of the primarily formed smoke gases means that secondary air has to be added and mixed into the waste gas which is still of high calorific value, as a result of which an afterburning operation is initiated. In the process, very high temperature peaks result locally, NO or $N_2$ being ultimately formed by complex reactions from the ammonia ($NH_3$) and hydrogen cyanide (HCN) formed primarily from the fuel nitrogen during the waste gas burn-out. However, a thermal formation of nitrogen oxide ($NO_x$ formation) from atmospheric nitrogen is comparatively low due to the relatively low temperature level in these combustion plants.

In the so-called SNCR (selective non-catalytic reduction) process, ammonia ($NH_3$) or other N-containing reducing agents, such as aqueous ammonia solutions or urea, are sprayed into the oxygen-containing waste gas downstream of the waste gas burn-out zone within a temperature range of 850 to 1050° C. for the selective non-catalytic reduction of nitrogen oxides in the waste gas. Excessive temperatures result in the formation of NO (nitrogen monoxide), while temperatures which are too low increase the $NH_3$ slip. An aqua ammonia ($NH_4OH$) is generally used. During evaporation of this solution, ammonia ($NH_3$) is released and NO is reduced into $N_2$ at the previously mentioned temperature level.

$$4NH_3+4NO+O_2 \rightarrow 4N_2+6H_2O \quad (1)$$

$NH_3$ can also be used as a neutralising agent in $SO_2$ scrubbers which are operated at neutral or slightly acidic pH. See P. Strasser, V. Fütterer: Betriebserfahrungen mit der Rauchgasentschwefelungsanlage des Rheinhafen-Dampfkraftwerkes und des Großkraftwerkes Mannheim; User report Abgasreinigung, special edition Staub Reinhaltung der Luft (1987) Book 10, pages 63-68. If an acid-operated first scrubber which generally operates at pH values <1 and in which HCl is separated practically quantitatively is connected upstream of the $SO_2$ scrubber, then $SO_2$ is selectively separated in the second washing stage connected downstream ($SO_2$ scrubber) using $NH_3$ at pH≤7. See DE 197 31 062 C2.

$$2NH_3+H_2O+SO_2 \rightarrow (NH_4)_2SO_3 \quad (2)$$

The ammonium sulphite which has formed (($NH_4)_2SO_3$) is oxidised into ammonium sulphate (($NH_4)_2SO_4$) with the oxygen contained in the waste gas or by additionally supplied oxidising air.

$$(NH_4)_2SO_3+\tfrac{1}{2}O_2 \rightarrow (NH_4)_2SO_4 \quad (3)$$

Halogenated organic compounds are, for example, polychlorinated dibenzo-p-dioxins and dibenzofurans (PCDD/F) which are formed in combustion processes, such as in refuse incineration, and are discharged with the waste gas. The formation of PCDD/F is basically caused when the carbon-containing and chloride-containing fly ash deposits on the boiler surfaces or during the dedusting operation in a temperature range of >200° C. The formation maximum of PCDD/F is within a temperature range of from approximately 300 to 350° C.

Due to their toxicity, the legislator in the Federal Republic of Germany has laid down a limit for the emission of these compounds from waste incineration plants of 0.1 ng TEQ/Nm$^3$ (TEQ=toxicity equivalent) in the 17$^{th}$ Federal Emissions Control Regulation (17$^{th}$ BImSchV). Based on today's knowledge, this limit for PCDD/F in the combustion waste gas is unsustainable by merely optimising the firing conditions. In this respect, it is known in the art to reduce the concentration of PCDD/F in the combustion waste gas below the prescribed limiting value with an additional smoke gas cleaning operation connected downstream of the combustion. Waste incineration plants substantially consist of a combustion chamber optionally with a boiler, at least one dust collector connected downstream and wet scrubbers as well as additional adsorptively and/or catalytically acting smoke gas cleaning processes for $NO_x$ and/or PCDD/F reduction. The SNCR process is also frequently used to reduce $NO_x$.

R. D. Griffin, "A new theory of dioxin formation in municipal solid waste combustion", Chemosphere, Vol. 15, Nos. 9-12, pp. 1987-1990, 1986 and K. Raghunathan, B. K. Gullett: Role of Sulfur in Reducing PCDD and PCDF Formation; Environ. Sci. Technol. 30 (1996) pages 1827-1834 generally describe that it is also possible to considerably reduce the PCDD and PCDF content in a waste gas merely by means of a sulphur excess relative to the chlorine stock during a combustion procedure. In this respect, the ratio of sulphur dioxide to hydrochloric acid in the smoke gas formed during combustion is of particular significance, resulting by sulphation reactions, in a considerable reduction of the chloride contents of the fly ash with an increasing ratio of sulphur dioxide to hydrochloric acid.

$$2(Na, K)Cl+SO_2+\tfrac{1}{2}O_2+H_2O \rightarrow (Na, K)_2SO_4+HCl \quad (4)$$

Metal chlorides exhibit an analogous behaviour to that of alkalis. During sulphation, the chlorides of the fly ash are converted into sulphates. The resulting low-chloride fly ash gives rise to a drastic reduction in the PCDD and PCDF formation potential and thus leads to a significant reduction in the PCDD/F concentration in the waste gas. Low-chloride fly ash deposits also entail a reduction in the boiler corrosion rates.

DE 103 38 752 B4 describes a process in which $SO_2$ is selectively separated from the smoke gas in at least one scrubber and is recycled into the combustion chamber as $SO_2$ or as sulphuric acid. Due to the selective separation of $SO_2$ in a scrubber, highly concentrated $SO_2$ is available for recycling. A result of recycling is the concentration of $SO_2$ and thus the reduction of the Cl/S ratio in the waste gas in the process zones relevant to the PCDD/F formation. However, this process does not allow a reduction in $NO_x$. In the process, an aqueous mixed salt solution of chlorides and sulphates is formed as a residue

SUMMARY

An aspect of the present invention is an apparatus and a process for the simultaneous reduction of nitrogen oxides and halogenated organic compounds in incineration plants comprising at least one combustion chamber, in which the aforementioned disadvantages or restrictions arise not at all or only to a very limited extent.

In an embodiment, the present invention provides for a process for reducing nitrogen oxides and halogenated organic compounds in an incineration plant having at least one combustion chamber. The process comprises separating out fly ash using a dust collector. Water is added to and hydrochloric acid separated out in a first acid-operated scrubber. Water and ammonia are added so as to separate out sulphur dioxide in a second neutral or slightly acid-operated scrubber so as to form ammonium sulphite, a portion of the ammonium sulphite being reacted with oxygen so as to form an aqueous ammonium sulphate/ammonium sulphite solution. The aqueous ammonium sulphate/ammonium sulphite solution is introduced into an oxygen-containing smoke gas downstream of a secondary gas introduction area so as to decompose the ammonium sulphate and ammonium sulphite so as to form ammonia and sulphur dioxide. Ammonia, oxygen and nitrogen oxides are reduced in the smoke gas by selective non-catalytic reduction so as to produce nitrogen and water, the chloride-containing fly ash in the smoke gas reacting with sulphur dioxide, water and oxygen so as to produce sulphates and hydrochloric acid.

BRIEF DESCRIPTION OF THE DRAWINGS

The present invention will be described in greater detail on the basis of exemplary embodiments with reference to the figures in which.

DETAILED DESCRIPTION

Figure 1:
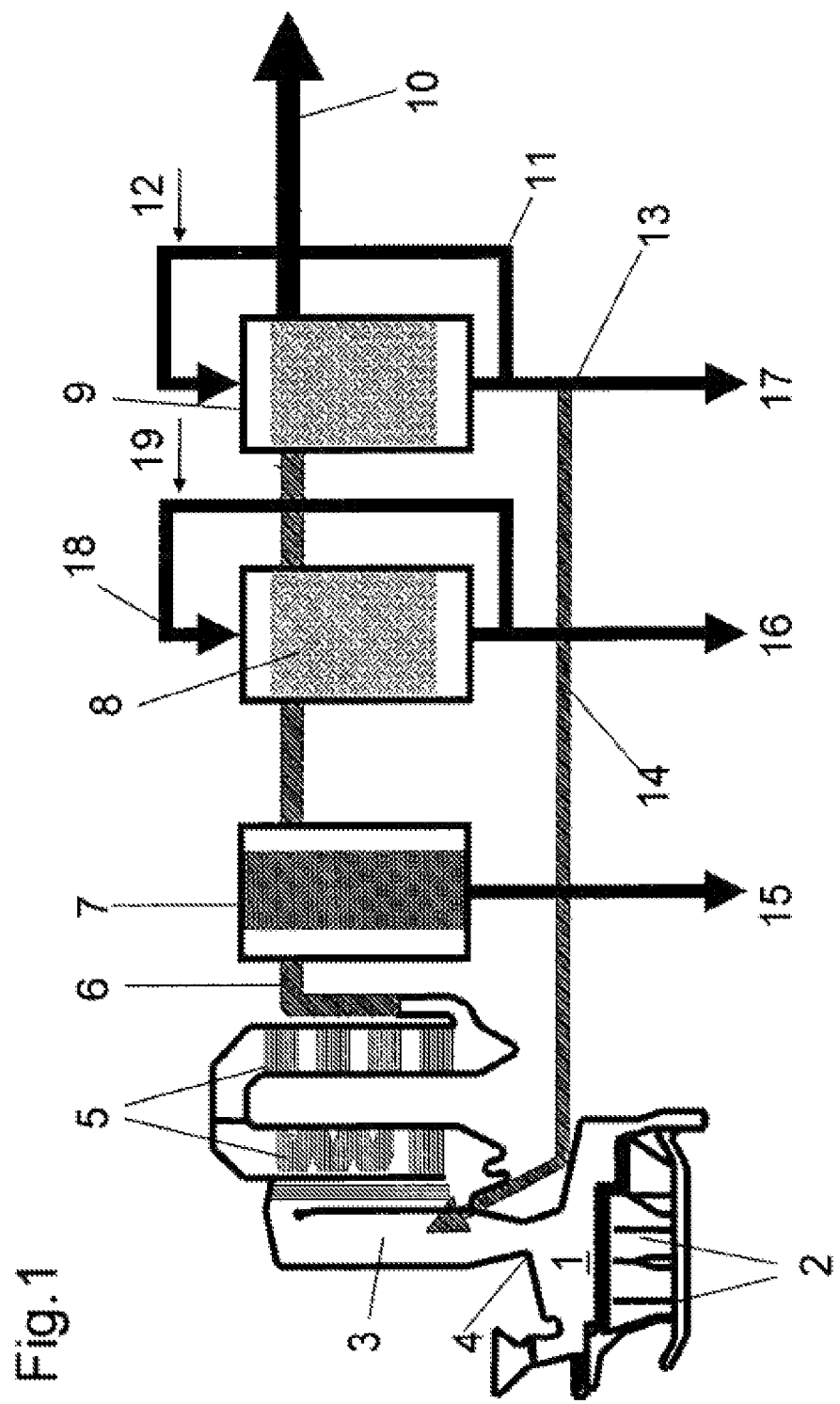
FIG. 1 shows the processing flows of the process in the schematically illustrated apparatus for reducing halogenated organic compounds, FIGS. 2a and 2b respectively show circuit diagrams of (a) a prior art SNCR apparatus and (b) an apparatus modified therefrom for the simultaneous reduction of $NO_x$ and of halogenated organic compounds.

An important idea of the present invention is that, starting from the aforementioned SNCR process, the ammonia is not introduced directly into the afterburn chamber to reduce nitrogen oxide (cf. equation (1)), but is previously introduced as an additive into the washing water circulation of a neutral or slightly acidic scrubber which is arranged downstream of an HCl scrubber, and is used to separate $SO_2$ with the formation of an aqueous ammonium sulphate/ammonium sulphite solution (cf. equations (2) and (3)).

The $NH_3$ required for the SNCR process is thus partly or completely used for the separation of $SO_2$ in the wet scrubber. The ammonium sulphate/ammonium sulphite solution which forms during the washing process in the scrubber can then be partly or completely introduced into the afterburn zone instead of the ammonia or in addition to the aqua ammonia for the aforementioned SNCR process. In the process, the ammonium sulphate/ammonium sulphite thermally decomposes with the formation of $NH_3$, $N_2$ and $SO_2$, $SO_2$ forms practically quantitatively, while only some of the nitrogen is obtained from the ammonium sulphate as $NH_3$. The $NH_3$ which has been produced is again available for the actual SNCR process. In the case of an existing plant with SNCR technology, the desalinated washing water (with $(NH_4)_2SO_4$)) can thus partly or completely replace the previously used $NH_3$. The aqueous ammonium sulphate/ammonium sulphite solution is, for example, added to the oxygen-containing smoke gas downstream of the waste gas burn-out zone in a temperature range of between 850 and 1050° C., for example between 900 and 1000° C., i.e., the temperature window, for example, in the SNCR process.

The ammonium sulphate/ammonium sulphite solution which is not recycled in the aforementioned manner can also be removed from the process as ammonium sulphate ($(NH_4)_2SO_4$) and disposed of or utilised separately.

During the decomposition of ammonium sulphate and ammonium sulphite in the afterburn zone, $SO_2$ can be released quantitatively and can be available to increase the $SO_2$ concentration in the waste gas (an $SO_2$ circulation is produced). The $SO_2$ concentration increase can be adjusted by the recycling rate. The PCDD/F reduction in the waste gas can thus be advantageously achieved, a considerable reduction in the chloride contents of the fly ash being produced by sulphation reactions as the ratio of sulphur dioxide to hydrochloric acid increases.

Ammonium sulphate is decomposed in the afterburn zone in two stages:

$$T=200–400° C.: (NH_4)_2SO_4 \rightarrow NH_4HSO_4+NH_3 \quad (5)$$

$$T>900° C.: 2NH_4HSO_4+½O_2 \rightarrow 2SO_2+N_2+5H_2O \quad (6)$$

With temperatures of above 900° C., more $SO_2$ is produced in the afterburn chamber and in turn intensifies the aforementioned sulphation reaction of the fly ash. In the process, chlorides contained in the fly ash are replaced by sulphates, with hydrochloric acid being produced which can then be separated from the waste gas in an acid-operated washing stage.

It can be possible to control the level of $SO_2$ concentration by the recycling rate of ammonium sulphate ($(NH_4)_2SO_4$ from the second scrubber.

Therefore, within the scope of the present invention, substances (residues) are exclusively recycled from the neutral or slightly acid-operated washing stage. The separate scrubber discharges allow a material utilisation of the residues (for example, production of HCl from an acid-operated washing stage).

The ammonium sulphate/ammonium sulphite solution can be added into the afterburn zone after the introduction of secondary gas, for example by means of a plurality of single or multicomponent nozzles. Single and multicomponent nozzles are used to spray the aqueous ammonium sulphate/ammonium sulphite solution and they promote a homogeneous mixing with the waste gas, it being possible, for example, to use compressed air or water vapour for the multicomponent nozzles.

The present invention in conjunction with an incineration plant consists, as shown in FIG. 1, of a combustion chamber 1 with an oxygen-containing primary gas supply 2, an afterburn chamber 3 with an oxygen-containing secondary gas supply 4, a boiler 5 or another component for cooling the crude waste gas 6, as well as dedusting stages connected downstream for the crude exhaust gas. These dedusting stages comprise a dust collector 7, for example a woven filter or an electrostatic filter, for separating fly ash 15, a first acid-operated scrubber 8 (pH≤1) for separating hydrochloric acid 16 and a second neutral or slightly acid-operated scrubber 9 (pH≤7) for separating $SO_2$ (discharge of ammonium sulphate and ammonium sulphite 17). The first acid-operated scrubber 8 has a scrubber circulation 18 with a water feed 19. After passing through the dedusting stages, the dedusted waste gas 10 can be discharged into the environment, for example via a chimney.

$SO_2$ can be dedusted in the second neutrally operated scrubber 9 in a scrubber circulation 11, an addition of an aqua ammonia 12 and a separation 13 of ammonium sulphate/ammonium sulphite solution which builds up in the scrubber being provided in the scrubber circulation 11. The separated ammonium sulphate/ammonium sulphite solution can be re-introduced into the waste gas branch (crude waste gas) via a connecting line 14 in the region of the afterburn chamber 3 (downstream of the waste gas burn-out zone). The excess portion of the unrequired ammonium sulphate/ammonium sulphite solution can be removed from the process (cf. discharge of ammonium sulphate and ammonium sulphite 17). The amount of the discharge arises as a result of the maximum required increase in the $SO_2$ concentration in the crude gas and as a result of the quantities of sulphate sluiced out via the fly ash 15.

The ammonium sulphate/ammonium sulphite solution can be introduced in a region having an oxygen excess caused by the secondary gas input, in order on the one hand to promote the reactions stated in the aforementioned formulae (5) and (6), i.e., an effective reduction of nitrogen oxide, and on the other hand to promote a sulphur dioxide formation to reduce halogenated organic compounds in the exhaust gas.

On its entry into the waste gas branch, the recycled ammonium sulphate/ammonium sulphite solution can be sprayed through one or more suitable inlets, such that it is ensured as far as possible that comparable reaction conditions are uniformly distributed over the entire waste gas cross section. This can be achieved, for example, by a spraying-in procedure via at least one or a plurality, of single-component or two-component spray nozzles which operate over the entire waste gas cross section.

Within the framework of the processing flows, a fuel can initially be burnt in the combustion chamber 1 with the supply of primary gas 2, and portions which have not yet completely burnt subsequently be burnt in the afterburn chamber 3 with the supply of a secondary gas 4. The crude waste gas which forms as a result and is at a temperature in the region of >900° C. (i.e., sufficient for reaction (6)) can be guided onto a boiler wall where it can release a certain amount of heat by heat transfer to the boiler 5 or of the medium in the boiler, the cooled crude waste gas 6 being cooled to temperatures of from 200 to 300° C. The crude waste gas can then flow through the first dedusting stage, the dust collector 7, which the waste gas leaves in the embodiment at the same temperature level in the direction of the first scrubber 8.

Dioxins and furans can be formed in the waste gas branch at a temperature level above 200° C., i.e., at the previously mentioned temperature level on the boiler wall and dust collector, but can be effectively reduced, as previously described, by the sulphur dioxide formed in the afterburn zone (reaction (6)).

In the first acid-operated scrubber, at pH values of preferably less than 1, hydrochloric acid can be selectively separated by absorption in water, without sulphur dioxide being separated. Consequently, this scrubber has, in addition to a water feed 19, a line for removing hydrochloric acid 16. The hydrochloric acid is not required for the process for reducing nitrogen oxides and halogenated organic compounds in incineration plants having at least one combustion chamber according to the present invention and can be utilised for a different purpose.

The mentioned $SO_2$ circulation process produces a gradual increase in the sulphur dioxide concentration in the crude waste gas precisely in the aforementioned regions of the dioxin formation. Under ideal conditions, the molar Cl/S ratio (of hydrochloric acid to sulphur dioxide) in the crude waste gas of domestic waste incineration plants can be reduced starting from 8-10 to values of <<1 (depending on the recycling rate).

The apparatus shown in FIG. 1 can be modified at a low cost in terms of technical equipment from an available SNCR apparatus (cf. FIG. 2a), and indeed without a basic new connection for the necessary ammonia. It is thus possible to switch the plant backwards and forwards from SNCR operation to the process according to claim 1 just through the use of valves. In an SNCR plant according to FIG. 2a, the ammonia is added 12 directly into the afterburn chamber 3, while the scrubber circulation 11 of the second scrubber 9 is fed with water and sodium hydroxide or calcium hydroxide (feed line of sodium hydroxide or calcium hydroxide 23) and has a discharge line of sodium sulphate and sodium sulphite or calcium sulphate and calcium sulphite 24.

Figure 2B:
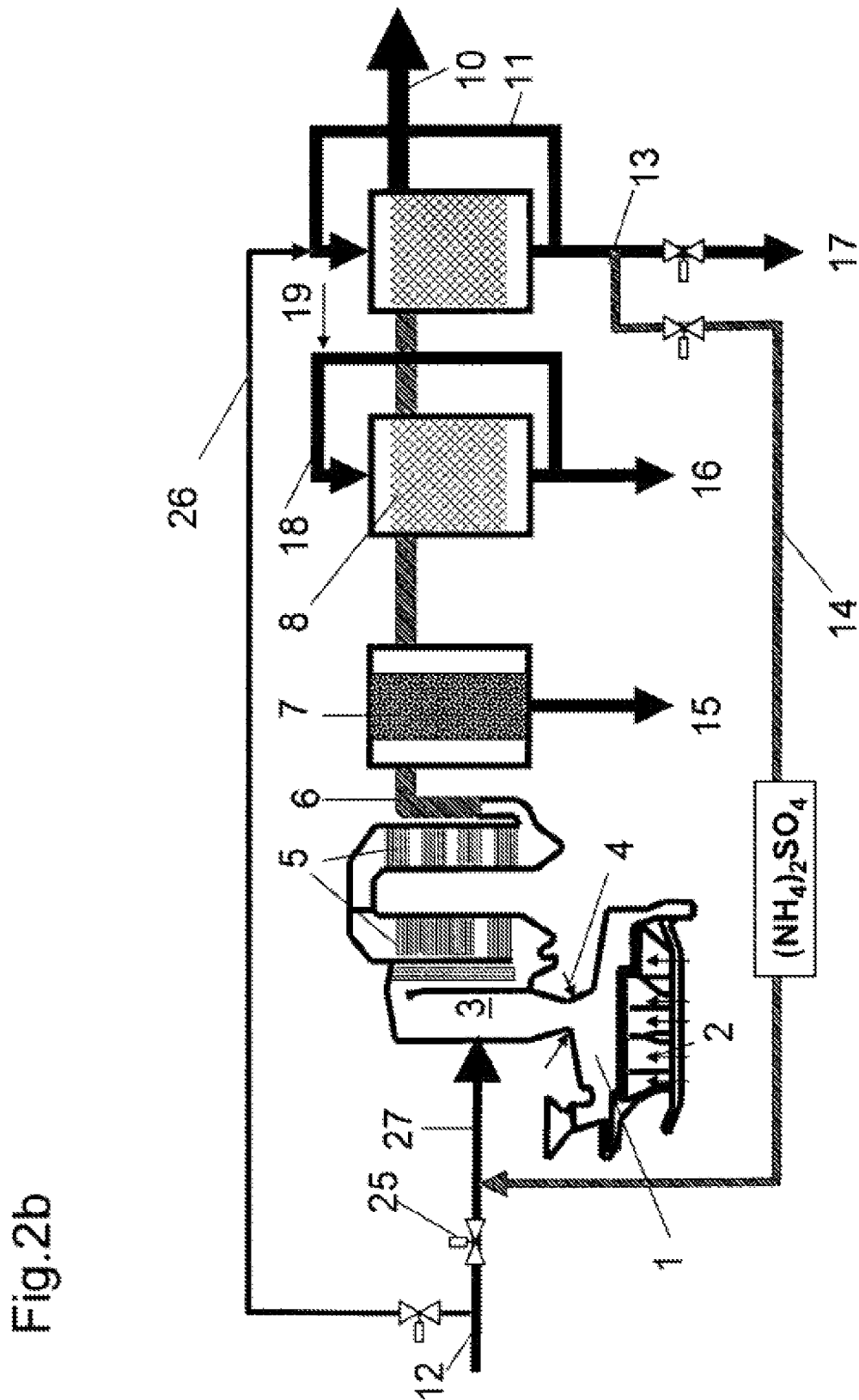

In order to convert the aforementioned SNCR plant into an apparatus for the additional reduction of halogenated organic compounds, only two additional line connections are required, as shown in FIG. 2b, SNCR operation converting the process for the additional reduction of halogenated organic compounds by means of a plurality of stop valves and control valves. Ammonia is now used as a neutralising agent instead of sodium hydroxide or calcium hydroxide. The ammonia addition 12 is not guided by a first connection into the afterburn zone 3 (valve 25 choked or completely closed), but can be guided via an ammonia line 26 into the scrubber circulation 11 of the second scrubber. $NH_3$ is fed into the $SO_2$ washing stage in a pH controlled manner. The ammonium sulphate/ammonium sulphite solution 13 likewise runs off via the connecting line 14, to a feed line 27 to the afterburn zone 3.

EXAMPLE

The process, apparatus and results achieved from tests carried out at the TAMARA waste incineration plant of the Karlsruhe research centre are described hereinafter by way of example. The construction corresponds to the embodiment shown in FIG. 1 or 2b.

At temperatures of 1020° C., an aqueous $(NH_4)_2SO_4$ solution (1 l/h, 600 g/l, at approximately 1000 $Nm^3$/h waste gas) was introduced into the first stream pass (downstream of the afterburn zone after introduction of the secondary gas) in a finely dispersed form by means of a two-component nozzle. The oxygen content in the afterburn zone was approximately 11% by volume dry.

Figure 3:
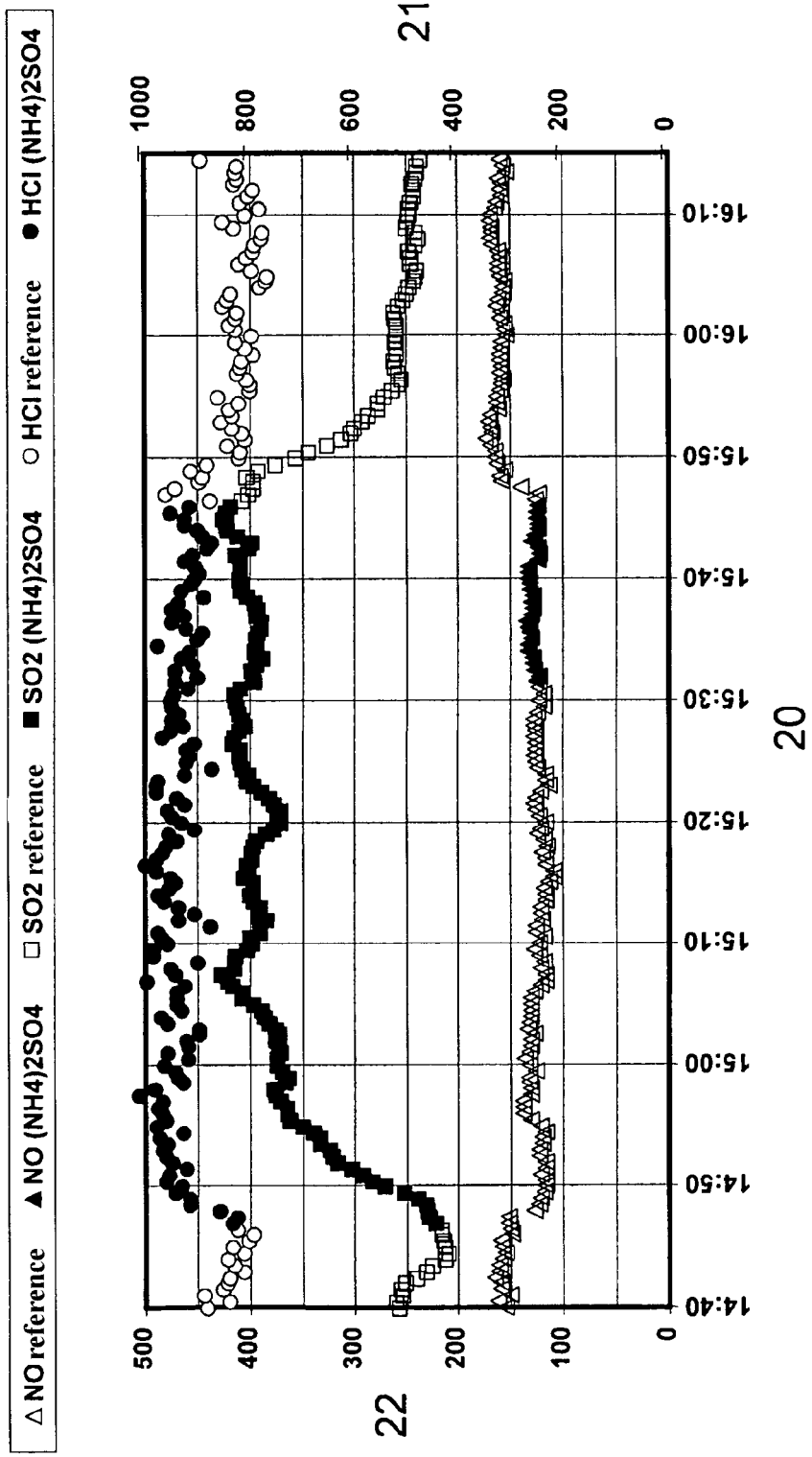
FIG. 3 shows the substances determined in the crude exhaust gas in an experiment carried out at the TAMARA waste incineration plant.

FIG. 3 shows as the result the concentrations, determined in the afterburn zone, of the substances HCl [mg/$Nm^3$] 21 as well as NO and $SO_2$ 22, in each case in [mg/$Nm^3$] and plotted over time 20. The black data points represent the values during the spraying-in operation of the aforementioned ammonium sulphate/ammonium sulphite solution, while the white data points represent reference values in the absence of this spraying-in operation.

The increase in the $SO_2$ concentration and the increase in the sulphate concentration of the fly ash corresponds to the quantity of sulphur contained in the added ammonium sulphate/ammonium sulphite solution. During the addition, the HCl concentration immediately increased by approximately 130 mg/$Nm^3$. The increase in the HCl concentration can be attributed to the sulphation of the chloride-containing fly ash. Even during the short fly phase of the ash particles in the high temperature zone, considerable quantities of sulphates were formed from chlorides in the fly ash.

At the same time, the NO concentration was reduced from approximately 160 to 120 mg/$Nm^3$. Starting from a recovery of approximately 50% $NH_3$ from the ammonium sulphate/ammonium sulphite, the experiment shows a stoichiometry of $NH_3$ to NO of n≈0.75. In industrial plants, n is generally set in the range of from 2 to 3. In the illustrated experiment, the temperature around the addition site was also slightly higher than the optimum for SNCR of approximately 980° C. While considering these conventional modes of operation, it is also possible to achieve a significantly greater $NO_x$ reduction with a corresponding optimisation. The result shows that the described process of a combined $NO_x$ and PCDD/F reduction and also a correspondingly higher $SO_2$ concentration is generally possible.

The process realises an $SO_2$ circulation. An advantage of this embodiment is an additional $NO_x$ reduction. A further advantage of the process is that the $SO_2$ concentration can be adjusted completely independently of the HCl concentration. The expense in terms of apparatus, in other words the modification of an existing SNCR plant (cf. FIG. 2a and b) is low, as are the operating material costs for $NH_3$ (cheaper than NaOH for $SO_2$ separation). The increase in the $SO_2$ concentration is a function of the recycle rate and the concentration of alkaline fly ash constituents and can basically be set at almost any level. The consumption of $NH_3$ increases proportionally to the increase of $SO_2$. For practical application, a molar Cl/S ratio (HCl/$SO_2$) of approximately 1 generally suffices for an efficient PCDD/F reduction. Furthermore, both washing circulations (scrubbers 8 and 9) are kept separate, such that it is possible to utilise/treat these two residual substance flows separately.

On the other hand, an addition of an $(NH_4)_2SO_4$ solution into the combustion chamber upstream of the waste gas burn-out zone caused only a small reduction in NOx. This effect can be attributed only to the primary gas mixing and temperature reduction brought about with the spraying-in of water. In this case as well, the increase in the $SO_2$ concentration corresponded to the added quantity of sulphate.

Figure 4:
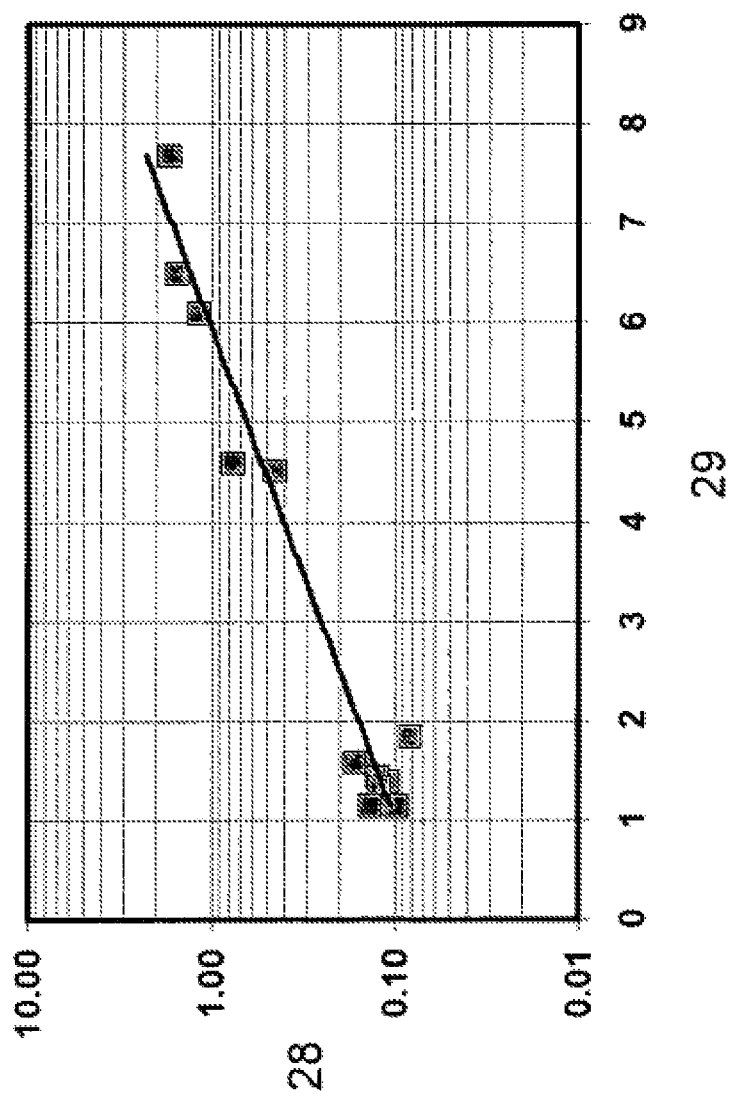
FIG. 4 shows a PCDD/F concentration in [$ng/Nm^3$ TEQ] in the crude gas as a function of the molar Cl/S ratio (of HCl/$SO_2$,) in the crude gas.

FIG. 4 shows the PCDD/F concentration 28 in [ng/$Nm^3$ TEQ] in the crude gas as a function of the molar Cl/S ratio 29 (of HCl/$SO_2$) in the crude gas. The individual values were determined in each case at TAMARA with a comparatively long stationary operation under efficient waste gas burn-out conditions.

LIST OF REFERENCE NUMERALS 1 combustion chamber
2 oxygen-containing primary gas supply
3 afterburn chamber
4 oxygen-containing secondary gas supply
5 boiler
6 crude waste gas
7 dust collector
8 acid-operated scrubber
9 neutral-operated scrubber
10 dedusted waste gas
11 scrubber circulation (second washing stage)
12 addition of ammonia
13 separation of ammonium sulphate/ammonium sulphite solution
14 connecting line
15 fly ash
16 hydrochloric acid
17 discharge of ammonium sulphate and ammonium sulphite
18 scrubber circulation (first washing stage)
19 water feed
20 time
21 HCl content [mg/$Nm^3$]
22 NO content, $SO_2$ content [mg/$Nm^3$]
23 feed line of sodium hydroxide or calcium hydroxide
24 discharge of sodium sulphate and sodium sulphite or calcium sulphate and calcium sulphite
25 valve
26 ammonia line
27 feed line
28 PCDD/F concentration in [ng/$Nm^3$ TEQ]
29 molar Cl/S ratio (dimensionless)

The invention claimed is:

1. Process for reducing nitrogen oxides and halogenated organic compounds in an incineration plant having at least one combustion chamber, the process comprising:
   separating out fly ash using a dust collector;
   adding water to a first acid-operated scrubber and separating out hydrochloric acid;
   adding water and ammonia to a second neutral or slightly acid-operated scrubber so as to separate out sulphur dioxide and to form ammonium sulphite, a part of the ammonium sulphite being oxidized so as to form an aqueous ammonium sulphate and ammonium sulphite solution; and
   introducing the aqueous ammonium sulphate and ammonium sulphite solution into an oxygen-containing smoke gas at a temperature range from about 850° C. to about 1050° C. downstream of a secondary gas introduction area so as to decompose the ammonium sulphate and ammonium sulphite to form ammonia and sulphur dioxide which in turn reduce nitrogen oxides in the smoke gas with the ammonia and oxygen by selective non-catalytic reduction so as to produce nitrogen and water, a chloride-containing fly ash in the smoke gas thereby reacting with sulphur dioxide, water and oxygen so as to produce sulphates and hydrochloric acid.

2. The process recited in claim 1, wherein the ammonium sulphate and ammonium sulphite solution is introduced by at least one of a single nozzle and a multiple-component nozzle.

3. Apparatus for reducing nitrogen oxides and halogenated inorganic compounds in an incineration plant having at least one combustion chamber, the apparatus comprising:
- a dust collector configured to separate fly ash;
- a first acid-operated scrubber configured to separate hydrochloric acid, the first acid-operated scrubber having a first discharge line configured to discharge the hydrochloric acid, and
- a second neutral or slightly acid-operated scrubber downstream of the first acid-operated scrubber, the second neutral or slightly acid-operated scrubber having a feed line for water and ammonia and a second discharge line for discharge of an ammonium sulphate and ammonium sulphite solution, wherein a connecting line branches off from the second discharge line to an afterburn chamber downstream of a secondary gas introduction area, the afterburn chamber being connected upstream of the first acid-operated scrubber.

* * * * *